United States Patent [19]

Haley

[11] 4,090,804
[45] May 23, 1978

[54] CIRCULAR DRILL WITH CENTERING DEVICE

[76] Inventor: Ernest K. Haley, 1210 Old Cannon Lane, Louisville, Ky. 40205

[21] Appl. No.: 765,718

[22] Filed: Feb. 4, 1977

[51] Int. Cl.² .................... B23B 27/10; B23B 51/06
[52] U.S. Cl. ........................................ 408/59; 408/68; 408/73; 408/86; 408/119; 408/204
[58] Field of Search .................. 408/57, 59, 68, 73, 408/74, 85, 86, 117–119, 200, 202–204, 206

[56] References Cited

U.S. PATENT DOCUMENTS

| 3,265,104 | 8/1966 | Gallo, Sr. | 408/68 |
| 3,546,980 | 12/1970 | Lemanski | 408/206 |

*Primary Examiner*—Leonidas Vlachos
*Attorney, Agent, or Firm*—David H. Semmes

[57] ABSTRACT

A circular cutting head assembly and centering drill of the type used, for example, in cutting holes in structural members such as I-beam webs, and flanges. The circular drill is characterized by a cylindrical body portion, supporting an inner centering drill plug. The centering drill plug is axially depressable as a centering hole is cut, so as to be pushed out of a mode of cutting registry with the outer cutting head and into a mode of non-registry which permits axial flow of lubricating oil through the body portion and onto the surface being cut within the periphery of the cutting teeth of the outer cutting head.

8 Claims, 3 Drawing Figures

U. S. Patent    May 23, 1978    4,090,804
FIG. 1
FIG. 2
FIG. 3
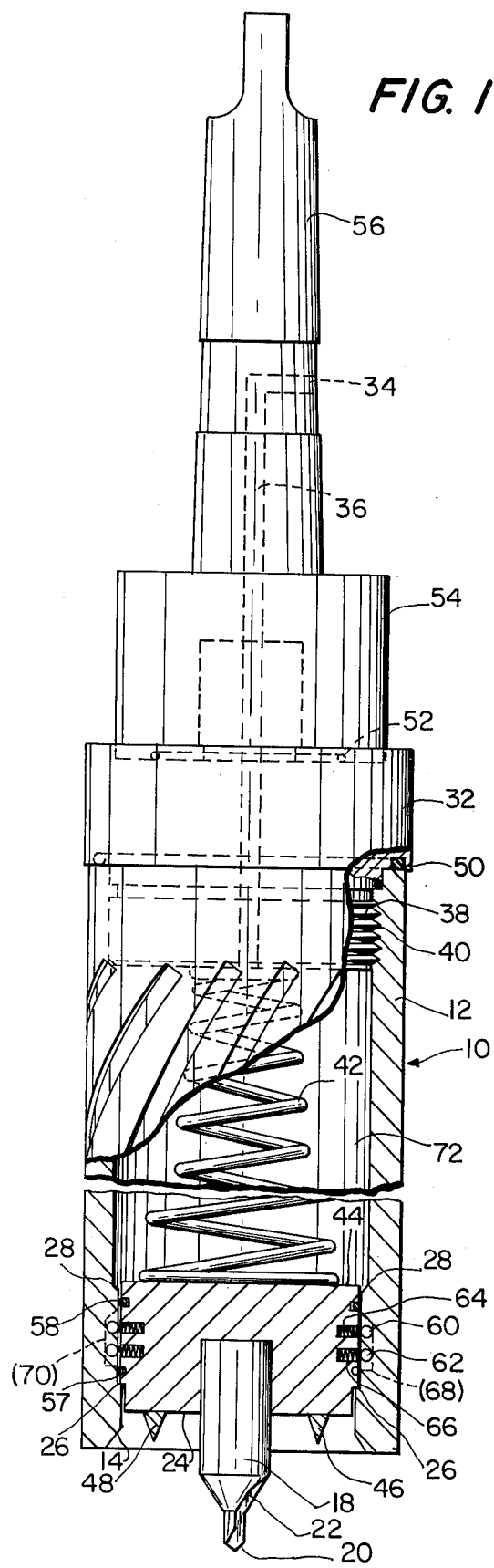
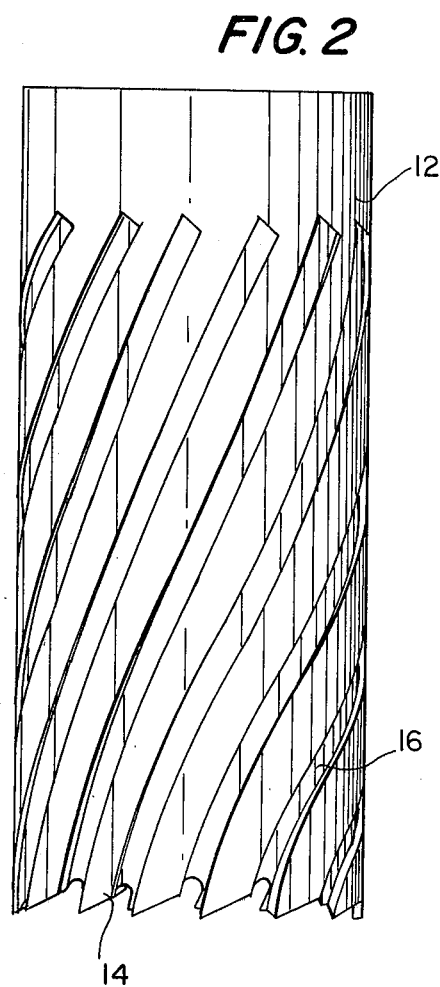
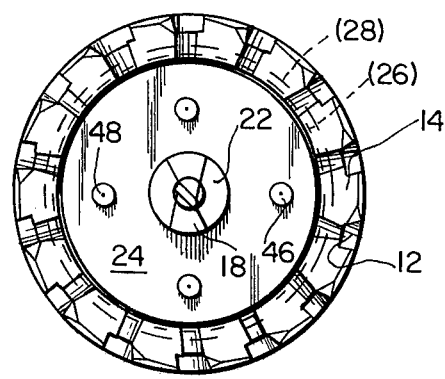

CIRCULAR DRILL WITH CENTERING DEVICE

BACKGROUND OF THE INVENTION

1. Field of the Invention

Cutting head assemblies, particularly those used for cutting steel structural members and the like. Such circular cutting drills are usually employed together with a centering or pilot drill which cuts a centering hole, prior to engagement of an outer circular drill with the surface to be cut.

2. DESCRIPTION OF THE PRIOR ART

Prior art investigation has developed the following: WEBSTER 58,924, HEYDENREICH 475,559, BERNAY 1,359,955, McGRATH 1,940,220, GONZALEZ 2,496,939, TREVATHAN 3,390,596.

Webster teaches a metal circular drill having a bore therein. Positioned within the drill and urged outwardly is a pointed member "d" which is centrally located. Member "d" is positioned on a punch mark to hold the drill in the desired spot. As the drill advances into the work the inner member "d" recedes into the outer drill body.

Heydenreich shows a plug cutter consisting of an outer circular cutter A with cutter teeth E and having a bore longitudinally therethrough. Within the bore is positioned another cutter N having a stem H projecting therefrom and adapted to slide within the outer cutter. A spring urges the inner cutter N downwardly. The outer and inner cutter rotate simultaneously.

Bernay discloses a drilling device including a shank portion 1, body portion 7 and drill 16, 17. The body portion has a bore therethrough and at the lower end is positioned an apertured plug 9 with spring 11 urging the plug downward. The cutting tool 16, 17 is positioned within a slot in 12, in the body portion, and held in place by plug 9. Lubricant in passageway 2, the bore in the body, hole in plug 9 and over the cutting tool. The device does not include an inner and outer tool.

McGrath discloses a boring tool having an outer pipe-like member 11 with cutters 31 at one end. Positioned within member 11 is a smaller concentric pipe also having cutters at one end. The inner and outer cutters are designed to operate simultaneously with one cutter making a small hole and the outer cutter enlarging the hole. The small cutter is lubricated via the passageway in the inner pipe, and the large cutter by fluid in the outer pipe.

Gonzalez shows in FIG. 3 a circular drill member 70 having a centering plug 75 positioned therein. A spring 76 urges the plug downward to locate the drill on a mark such as a punch mark. As the drill proceeds to cut, the plug 75 moves upwardly.

Trevathan teaches a cutting head assembly having a circular cutter 25 with a bore therein. Positioned within the bore is a pilot drill 55. The circular cutter and pilot drill rotate simultaneously. Slidably positioned on the pilot drill is a disc 55 urged downwardly by spring 69. When drilling into material, and after the cut is completed, the disc discharges the circular piece of material in the circular cutter.

SUMMARY OF THE INVENTION

According to the present invention a cutting head assembly of the type adapted to be rotatably driven about its longitudinal axis, having a cylindrical body portion open at its lower end with a plurality of cutting teeth around said lower end, is provided with a centering drill. The centering drill is inwardly and concentrically positioned within the body portion such that an inner cutting head extends axially outwardly beyond the cutting teeth of the circular cutting head. The centering drill is spring urged into an initial cutting mode where its periphery is registrable with the inner wall of said body portion. As drilling commences and a pilot hole is cut by the centering drill, the centering drill is axially and inwardly depressed into a mode of non-registry with said outer drill, such that the centering drill ceases to rotate. The axial depression of the centering drill permits flow of lubricant axially of the cylindrical body portion and on to the surface being cut by the outer circular drill.

BRIEF DESCRIPTION OF THE DRAWINGS

FIG. 1 is a side elevation, partially in section, showing the cutting head assembly with its centering drill and lubricating or coolant plug component supported within;

FIG. 2 is an elevation of the cutting head; and

FIG. 3 is a bottom plan, showing positioning of the centering drill with respect to the cylindrical body portion of the cutting head.

DESCRIPTION OF PREFERRED EMBODIMENTS

As illustrated in FIG. 1, the cutting head assembly 10 includes a cylindrical body portion 12, having at its lower open end a plurality of circumferentially disposed cutting teeth 14. As illustrated in FIG. 2 the individual cutting teeth are defined by "land" portions alternately disposed with angular groove portions 16 in the outer surface of the body portion. A centering drill 18, defining punching or cutting point 20 and plural cutting edges 22 may be supported medially within a drill and coolant or lubricating plug 24. The drill and coolant plug 24, resting upon lower, inner sholder 26 within the body portion, includes a plurality of axially extending tangs 46, 48 which provide both guiding and support functions as a center hole is punched, for example in an I-beam flange or web. Drill and coolant plug 24 may include a plurality of ball detents 60, 62, urged radially outwardly by means of compression springs 64, 66 or the like and into axially aligned registering slots 68 and 70 (illustrated in phantom) defined in the inner wall of body portion 12. Compression spring 42 urges drill and coolant plug 24 onto inner shoulder 26 such that the ball detents 60, 62 register in the registering slot 68 and 70, as these ball detents register, plug 24 and centering drill 18 rotate simultaneously with body portion 10. Thus the centering may be used for indexing the body portion and cutting teeth 14 with respect to a punched hole in an I-beam or the like. The punched hole is then cut deeper by drill 18 and until such time as tangs 46, 48 contact the surface of the I-beam. Pressure of the I-beam upon the tangs, forces the drill and coolant plug 24, as well as centering drill 18, axially away from the I-beam and axially inwardly of the body portion such that the expanded diameter area, defined at its lower limit by inner shoulder 28, permits disengagment of O-ring seals 57 and 58 from the inner wall of the body portion. Lubricant thus flows axially between plug 24 and the inner wall surface and onto the surface being cut as the outer circular drill begins to cut into surface. The drill and coolant plug is thus in a mode of non-registry with the housing 12 and thereby held stationary in a non-rotating attitude.

As illustrated in FIG. 1 the housing 10 may include a coolant adaptor 32, having its lower portion 38 threadedly engaged as at 40 with the inner wall of the body portions and including periphery 0-ring seals 52 and 50. A conventional Morse taper and bit mounting 56 may be employed, so as to provide lubricant and pressurized air entry port 34, communicating with axial channel 36 extending through the lower portion of bit taper 54 into coolant adaptor 32 and the inner chamber 72 of body portion 12. Lubricating oil may be injected through entry port 34 by means of pressurized air, for example, 100–120 lbs. psi., such that the pressurized air forces the coolant or lubricating plug downwardly into the cutting mode. As plug 24 is axially depressed into its mode of non-registry, the pressurized air forces the lubricant between plug 24 and the inner wall of body portion 12. The pressurized air then distributes the lubricant to the surface being cut and radially blows away shavings from the area of cutting teeth 14.

As will be apparent, the centering drill and coolant plug 24 are indexed with respect to the outer drill be means of axial slots which may be as many as four in number, so as to provide for initial guidance of the outer circular drill in a cutting mode. As the mode of non-registry and centering drill and plug is axially depressed to a non-rotation, flow of lubricant begins. Manifestly, various techniques may be employed for depressing the centering drill and permitting flow of lubricant without departing from the spirit and the scope of the claims.

I claim:

1. In a cutting head assembly of the type adapted to be rotatably driven about its longitudinal axis and comprising a circular cutting head having a body portion with a plurality of cutting teeth circumferentially disposed with respect to its lower open end, the improvement comprising:
   A. A centering drill inwardly and concentrically positioned within said body portion such that an inner cutting head extends axially outwardly beyond the cutting teeth of said circular cutting head, said centering drill being:
      i) registrable at its periphery with the body portion of said outer circular drill in an initial cutting mode and
      ii) axially depressable within said body portion of said circular cutting head into a mode of non-registry with said body portions of said cutting head as a centering hole is cut, such that said centering drill ceases to rotate as said circular drill engages a surface to be cut, and
   B. A centering drill and coolant plug supporting in its periphery a liquid sealing means engageable with the inner wall of said body portion of said circular cutting head and supporting in its lower mid-portion said centering drill, said body portion including a lubricating channel extending into the body portion and openable so as to flow lubricant, as said centering drill is depressed to its mode of non-registry said centering drill and coolant plug including a plurality of ball detents embedded in its periphery and outwardly extending into complementary registering slots defined in the inner wall of said body portion so as to index said centering drill ad coolant plug with the body portion of said circular cutting head in said initial cutting mode.

2. A cutting head assembly as in claim 1, said centering drill and coolant plug having a plurality of axially depending tangs, engageable with the surface being cut, as a support for said centering drill and as pressure points for depression of said plug into said mode of non-registry.

3. A cutting head assembly as in claim 1, including a compression spring means interposed between said centering drill and coolant plug and an upper end of said body portion, so as to urge said plug and said centering drill axially outwardly of said body portion.

4. A cutting head assembly as in claim 3, said circular cutting head body portion having at its lower end:
   i. an inner shoulder defining a seat for said centering drill and coolant plug, and
   ii. an upper shoulder defining an expanded diameter core, so as to permit flow of lubricant intermediate the inner wall of said body portion and said plug when said plug is in said mode of non-registry.

5. A cutting assembly as in claim 4, including:
   C. A bit mounting sealing secured to the upper portion of said body portion, so as to rotate said body portion and, thus, said centering drill.

6. A cutting assembly as in claim 5, including a coolant adaptor interposed between said bit mounting and said body portion, said coolant adaptor having an inner lubricating channel extending axially of said coolant adaptor and into said body portion.

7. A cutting assembly as in claim 6, said coolant adaptor threadedly engaging an inner wall of said body portion and including peripheral O-ring sealing means engagable with said body portion.

8. A cutting assembly as in claim 4, said lubricating channel being adapted to flow pressurized air, as well as lubricant, into said body portion.

* * * * *